US008353645B1

(12) United States Patent
Laun

(10) Patent No.: US 8,353,645 B1
(45) Date of Patent: Jan. 15, 2013

(54) COUNTERBORE BIT

(76) Inventor: Craig M. Laun, West Chester, OH (US)

( * ) Notice: Subject to any disclaimer, the term of this patent is extended or adjusted under 35 U.S.C. 154(b) by 542 days.

(21) Appl. No.: 12/798,820

(22) Filed: Apr. 13, 2010

(51) Int. Cl.
*B23B 51/00* (2006.01)

(52) U.S. Cl. ......................... 408/225; 408/204; 408/228

(58) Field of Classification Search .................. 408/204, 408/206, 223, 224, 225, 228; *B23B 51/00, B23B 51/04, 51/05*
See application file for complete search history.

(56) References Cited

U.S. PATENT DOCUMENTS 1,561,463 A * 11/1925 De Rochemont ............. 408/201
4,043,698 A * 8/1977 Chelberg ...................... 408/201
4,289,432 A * 9/1981 Elkins et al. .................. 408/201
4,512,691 A * 4/1985 Dicke ........................... 408/201
2005/0244238 A1* 11/2005 Burk ............................ 408/204

FOREIGN PATENT DOCUMENTS

GB 2359774 A * 9/2001

* cited by examiner

*Primary Examiner* — Daniel Howell
*Assistant Examiner* — Michael Vitale
(74) *Attorney, Agent, or Firm* — Neal O. Willmann

(57) ABSTRACT

A counterbore bit having a blade with paired cutting edges along the distal end of the blade and a circular pilot with a serrated cutting edge positioned medially between the paired cutting edges can be positioned over an embedded nail or fastener and activated to free or clear the embedded nail by creating a pair of concentric bores around and about the nail thus facilitating its extraction by conventional means.

4 Claims, 3 Drawing Sheets

COUNTERBORE BIT

BACKGROUND OF THE INVENTION

This invention relates to a new tool or device for the removal of embedded fasteners from a substrate. Typically, the fastener to be removed is a nail embedded in a wooden substrate. Specifically, the disclosed tool, because of its design and mode of operation, can be fairly characterized as a counterbore bit. It is specifically designed to facilitate the removal of embedded fasteners from a substrate by removing substrate and exposing the fastener sufficiently for a fastener extraction device to secure an attachment to or grip on the fastener. For example, the disclosed counterbore bit will dramatically enhance the effectiveness of the fastener extraction device disclosed in U.S. Pat. No. 7,658,368 because it will provide access to an embedded fastener without which the patented extraction device cannot perform. But, of course, the instantly disclosed counterbore bit can be used to expose fasteners so that any prying tool or device can grip the fastener and effect removal.

The disclosed bit finds specific use and application in the dismantling of weathered structures, such as barns and fences, where the wood has enhanced value because of the weathering, or re-use is simply economical, and dismantlement by brute-force nail removal would damage too much of the wood.

BRIEF SUMMARY OF THE INVENTION

The disclosed counterbore bit comprises a blade having proximal and distal ends and paired faces between the two ends. A medially positioned, three-sided, right-angular notch having parallel sides and an upper top edge is cut into the distal end of the blade. The blade also has a pair of beveled surfaces positioned on each lateral side of the notch, each beveled surface slanting at an angle equal to, but in the opposite direction of, the other to form paired cutting edges along the distal end of the blade.

The bit further includes a circular pilot positioned and permanently affixed within the notch. The circular pilot comprises an annular housing having proximal and distal ends. The proximal end of the pilot housing extends to the predetermined top of the notch, and the distal end of the housing projects distally for a predetermined distance away from the paired cutting edges of the blade. The distal end of the annular housing has a serrated cutting edge. In operation, the serrated cutting edge is positioned over the head of the embedded fastener, which serves as a guide to confine the action of the cutting edges of the bit to the area of the substrate immediately around the embedded nail.

A shaft extends proximally from the blade opposite the circular pilot for the purpose of providing a structure for attachment to a tool capable of activating the bit in a circular motion. Depending on the intended use of the disclosed bit, it can be powered by hand or by an electric hand drill or battery powered tool such as a cordless drill.

DETAILED DESCRIPTION OF THE INVENTION

Figure 1:
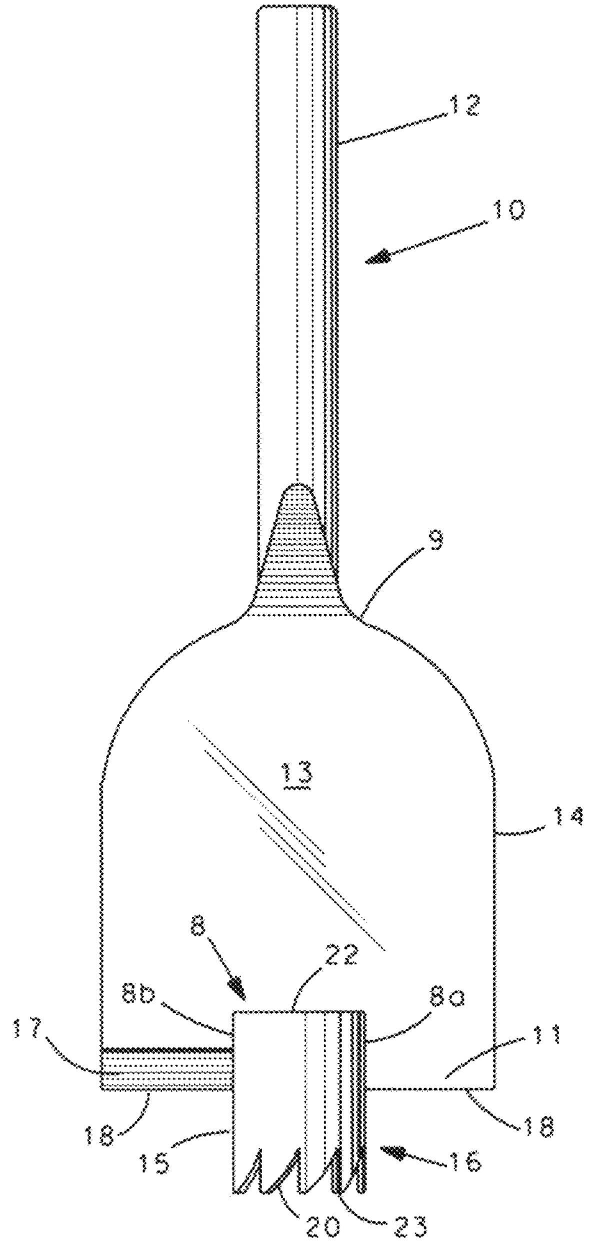
FIG. 1 is an elevated front or back view of the disclosed counterbore bit.

Appreciation of the counterbore bit can be enhanced by frequent reference to the drawing. FIG. 1 is an elevated front/back view of the disclosed counterbore bit 10 depicting all of the essential elements. Immediately apparent is the blade 14. The blade is symmetrical and has paired flat faces or sides 13 which are typically spade-shaped and essentially equal in shape and size, and because they are identical, they need not be differentiated as front or back. For convenience of description, the blade can also be said to have a distal 11 and a proximal end 9. Extending from the distal end of the blade is a shaft or shank 12. The purpose of the shaft is to permit or facilitate attachment of the bit to a tool for the empowerment and actuation of the bit. The tool can be as simple as a lever for hand-actuation, or more typically, the tool can be an electrically powered tool such as a power drill.

A three-sided, right-angular notch 8 is cut into the distal end 11 of the blade. It is essential that the notch be positioned medially within the distal end of the blade. Two of the three sides of the notch are parallel *8a* and *8b*, and the third side 22 is perpendicular to the parallel sides. The third side is denominated the stop 22 and clearly depicted in FIGS. 3 and 4.

Figure 2:
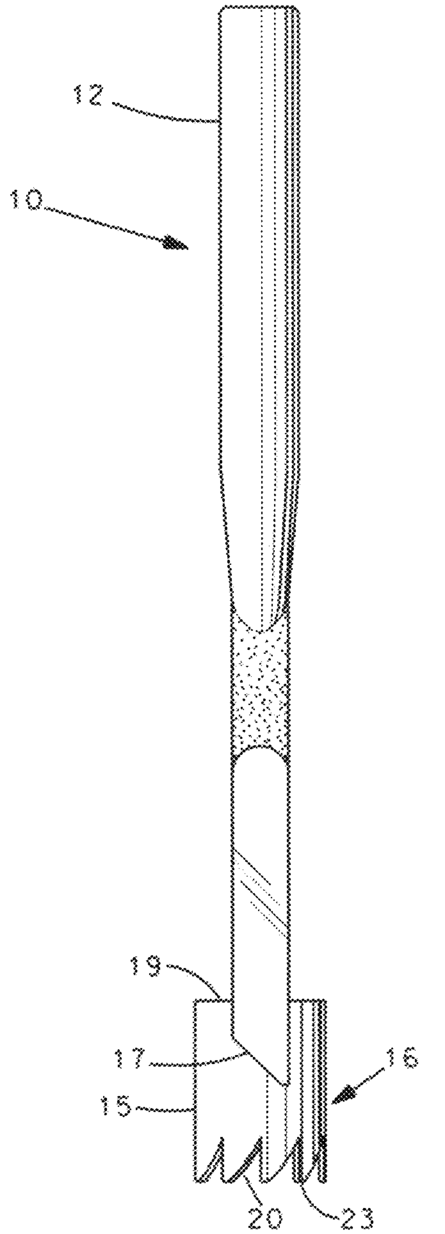
FIG. 2 is an elevated right or left side view of the bit.
Figure 3:
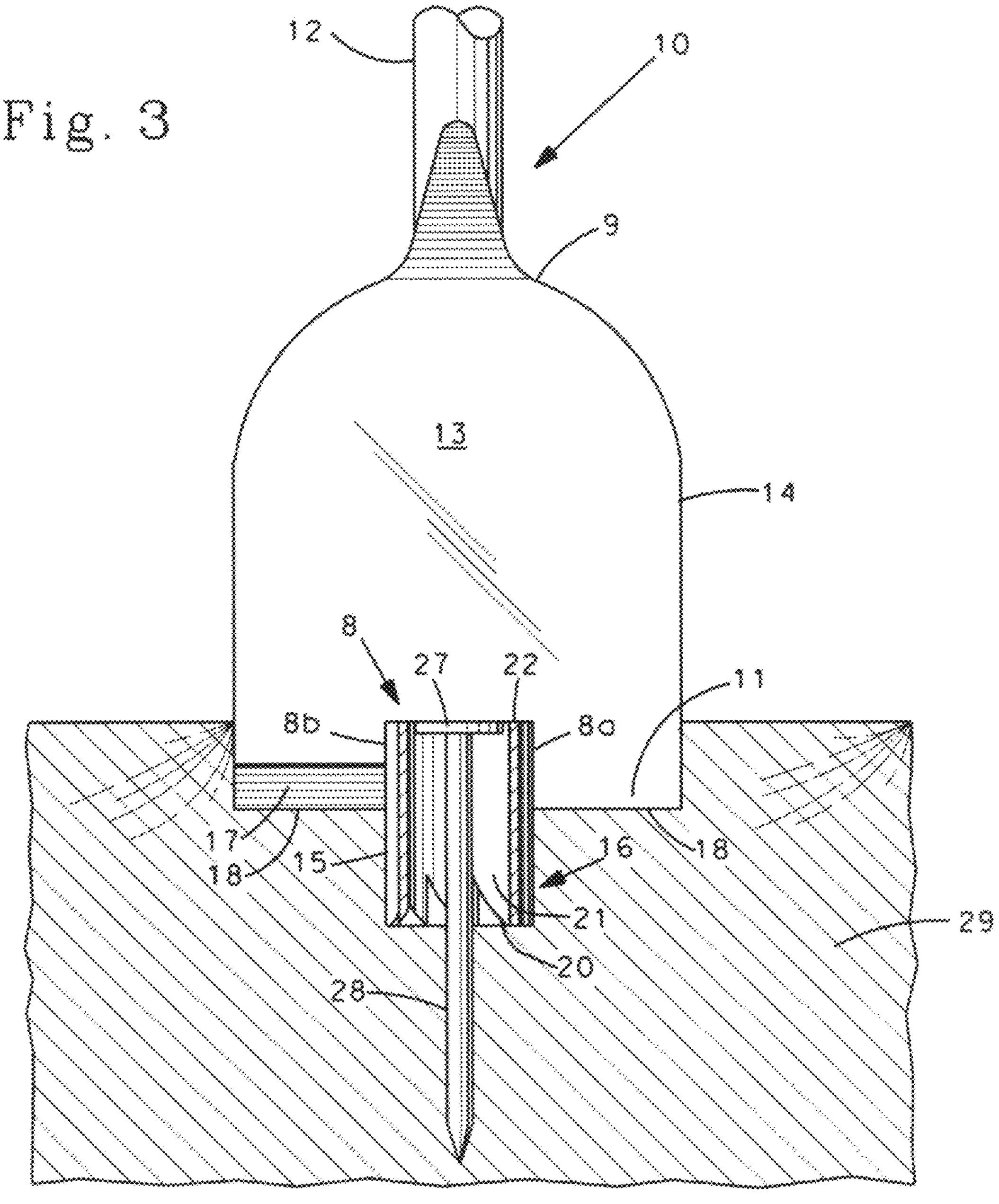
FIG. 3 is a partial front/back view of the disclosed bit in association with an embedded nail. The circular pilot of the bit is shown in cross-section to illustrate how the disclosed bit exposes the embedded nail to enable extraction.
Figure 4:
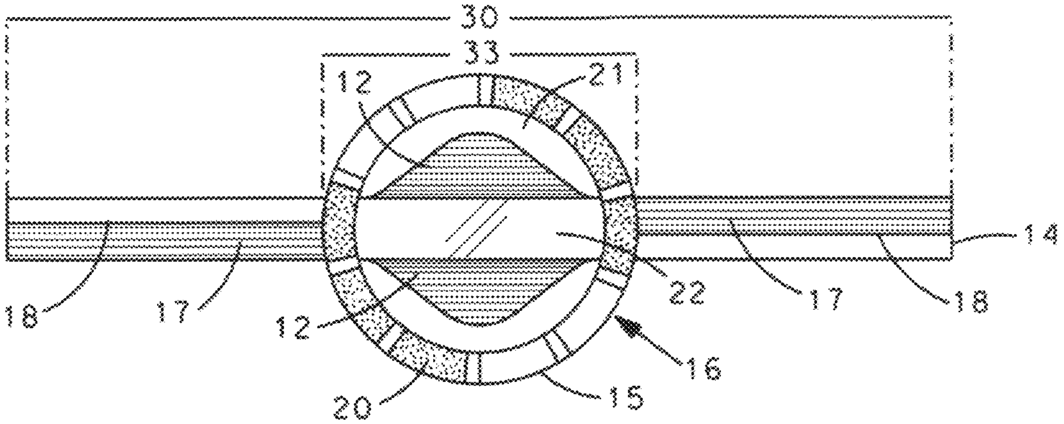
FIG. 4 is a bottom end plan view of the disclosed bit illustrating all the boring and/or cutting edges of the bit.

On both sides of the medially positioned notch 8 are a pair of beveled surfaces 17. Each beveled surface 17 slants at an angle equal to, but in the opposite direction of, the other to form paired cutting edges 18 along the distal end of the blade on both sides of the notch. The front/back view of FIG. 3 illustrates one of the paired beveled surfaces 17, and FIG. 4, a bottom end plan view, illustrates both of the paired beveled surfaces 17 and the paired cutting edges 18. The angularity of beveled surface 17 is readily apparent in the elevated side view of FIG. 2.

A circular pilot 16 is positioned within the notch 8. The circular pilot comprises an annular housing 15 having proximal 19 and distal 23 ends. The annular housing is permanently positioned within the notch, and, being annular, extends beyond the faces 13 of the blade. The distal end 23 of the annular housing 15 of the pilot 16 also projects distally for a predetermined distance away from the distal end 11 of the blade 14. The distal end 23 of the pilot housing 15 features a serrated cutting edge 20.

The primary purpose of the disclosed bit 10 is to facilitate the removal of embedded fasteners, typically nails, from substrates. The substrates are typically lumber of value and consequence. Most nail removal devices require that some part of the nail, typically the head, be exposed and available to provide a gripping surface for the removal device to function. The disclosed counterbore bit performs the function of exposing the head of an embedded nail to permit extraction.

FIG. 3 illustrates the function of the disclosed bit 10 relative to the removal of an embedded nail 28 from a substrate 29. Operationally, the circular pilot 16 is positioned directly over the head 27 of the embedded nail 28. The bit 10 is then actuated, either by hand or by an electric powered tool, and the serrated cutting edge 20 in the distal end 23 of the housing 15 of the circular pilot 16 penetrates the substrate 29 and cuts a flat-bottomed inner bore 26, or counterbore, under and around the head 27 of the nail 28. The debris from the inner bore accumulates within the inner cavity 21 of the annular housing 15. As the exposure of the embedded nail progresses, the paired cutting edges 18 of the blade 14 encounter the substrate, and they commence the creation of an outer bore 24, the debris from which is free to escape the work area. Furthermore, it is interesting and important to note that the head 27 of the embedded nail 28 or fastener serves as a guide to position and maintain the "focus" of the circular pilot 16 over and around the embedded nail. In other words, the annular design of the circular pilot is disposed to create a circular bore in the substrate, but because the fastener is typically more dense and durable than the substrate, it will "deflect" the bit and allow the circular pilot to bore neatly around the fastener.

Figure 5:
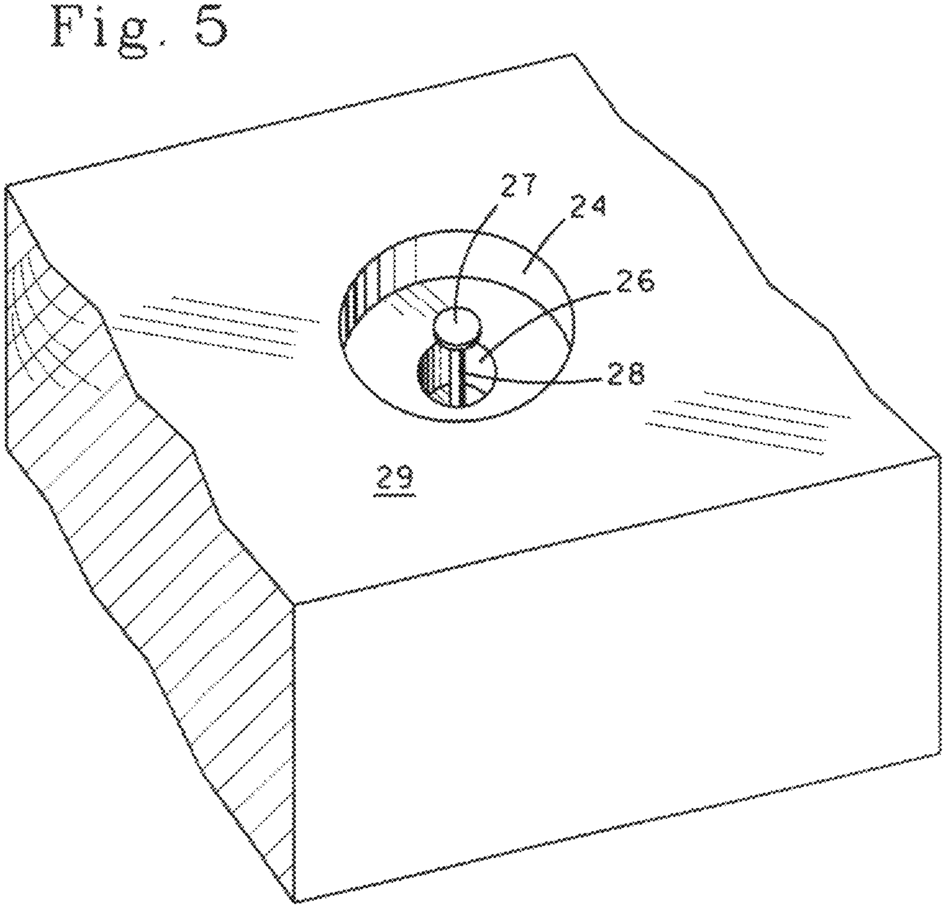
FIG. 5 illustrates an erstwhile embedded fastener (nail) that has been exposed by the operation of the disclosed tool prior to extraction.

Typically, actuation of the counterbore bit continues until the head 27 of the nail 28 encounters the stop 22, which is structurally the top side of the notch 8. Once the head of the nail encounters the stop, the nail is deemed to be sufficiently un-embedded and suitably free of the substrate to permit extraction by any of a variety of extraction tools, such as a crowbar, pry bar or an electrically powered device such as the one described in U.S. Pat. No. 7,658,368. FIG. 5 illustrates the concentric inner 26 and outer 24 bores created by the disclosed bit 10 around a previously embedded nail. The relative diameters of the serrated cutting edge 20 and the paired cutting edges 18 are depicted as 33 and 30 in the bottom end view provided by FIG. 4.

While the foregoing is a detailed and complete description of the preferred embodiments of the disclosed counterbore bit, it should be apparent that numerous variations and modifications can be made and employed to implement the all-important purpose of the disclosed bit without departing from the spirit of the invention, which is fairly defined by the appended claims.

The invention claimed is:

1. A counterbore bit actuated by a tool, which comprises:

a blade having proximal and distal ends and paired faces between said ends, said blade having a three-sided, right-angular notch positioned medially in said distal end of said blade and having parallel sides and a top edge, said blade also having a pair of beveled surfaces positioned on each side of said notch, each bevel slanting at an angle equal to, but in the opposite direction of, the other to form paired cutting edges along the distal end of said blade;

a circular pilot positioned within said notch, said pilot having an annular housing having proximal and distal ends, the proximal end of said housing extending to the top of said notch and said distal end of said housing projecting distally for a predetermined distance away from said cutting edges of said blade, said distal end of said annular housing having a serrated cutting edge; and a shaft extending proximally from said blade and opposite said circular pilot for attachment to said tool capable of activating said counterbore bit.

2. The counterbore bit according to claim 1 wherein the shaft is attached to a lever for the application of hand-power.

3. The counterbore bit according to claim 1 wherein the shaft is attached to an electric powered tool.

4. The counterbore bit according to claim 1 wherein the paired faces are spade-shaped.

* * * * *